United States Patent [19]

Fast

[11] Patent Number: 5,390,591
[45] Date of Patent: Feb. 21, 1995

[54] SHELL CRACKER

[75] Inventor: Henry Fast, Leamington, Canada

[73] Assignee: Fastlock Inc., Oakville, Canada

[21] Appl. No.: 165,611

[22] Filed: Dec. 13, 1993

[51] Int. Cl.$^6$ .............................................. A23N 5/00
[52] U.S. Cl. ..................................... 99/578; 99/568
[58] Field of Search ................. 99/568, 577, 578, 581; 100/266, 233, 291, 902

[56] References Cited

U.S. PATENT DOCUMENTS

| 1,123,852 | 1/1915 | Costa | 99/578 |
| 1,222,330 | 4/1917 | Sauvage | 99/578 |
| 1,315,557 | 9/1919 | Kepler et al. | 99/578 |
| 1,693,493 | 11/1928 | Patton | 99/578 |
| 2,285,355 | 6/1942 | Pricer | 99/578 |
| 3,299,802 | 1/1967 | Black, Jr. | 99/577 |

*Primary Examiner*—Timothy F. Simone
*Assistant Examiner*—Reginald L. Alexander
*Attorney, Agent, or Firm*—Bereskin & Parr

[57] ABSTRACT

A shell cracker is provided for cracking nut shells, crab claws, lobster claws and the like. The shell cracker has a base with front and rear upstanding supports. An upper lever is connected at the front support for rotation about a first axis and a lower lever is connected at the rear support for rotation about a second axis. The lower lever extends from the rear support to the front support. The first and second axes are spaced and the first axis is higher than the second axis. The upper lever has a downwardly facing cam adjacent to the front support. The lower lever has an upwardly facing cam follower adjacent to the front support. Upper and lower jaws are located on the upper lever and base respectively. The jaws are moved from an open position to a closed position, in order to crack a shell, by movement of the upper lever which, by means of the cam, causes movement of the lower lever.

11 Claims, 5 Drawing Sheets

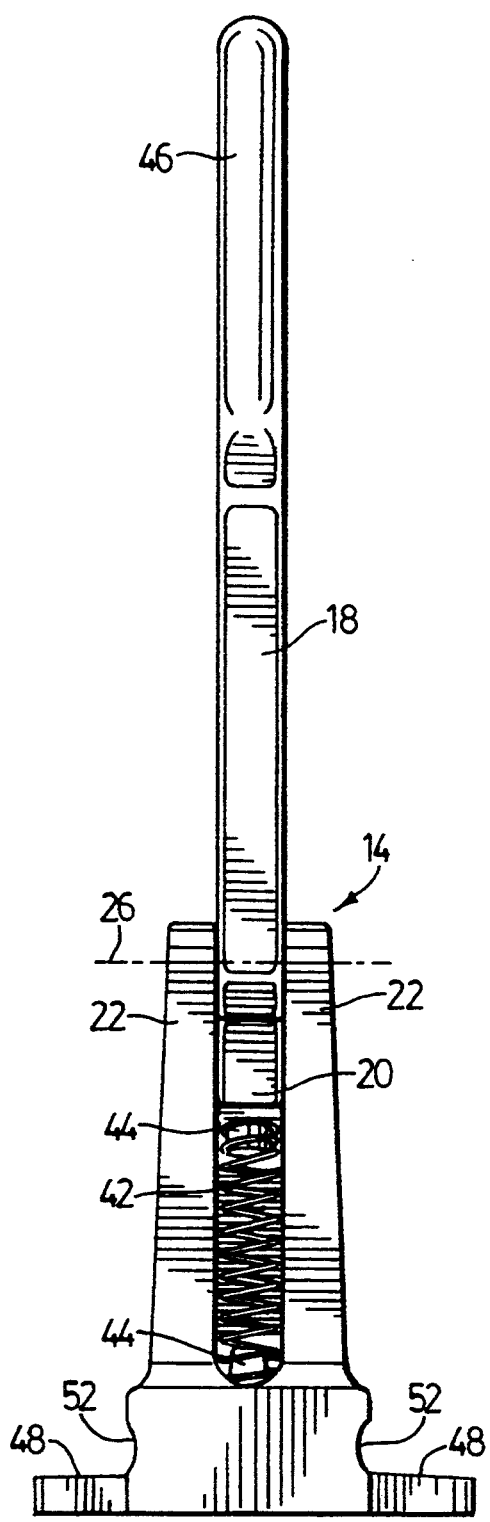
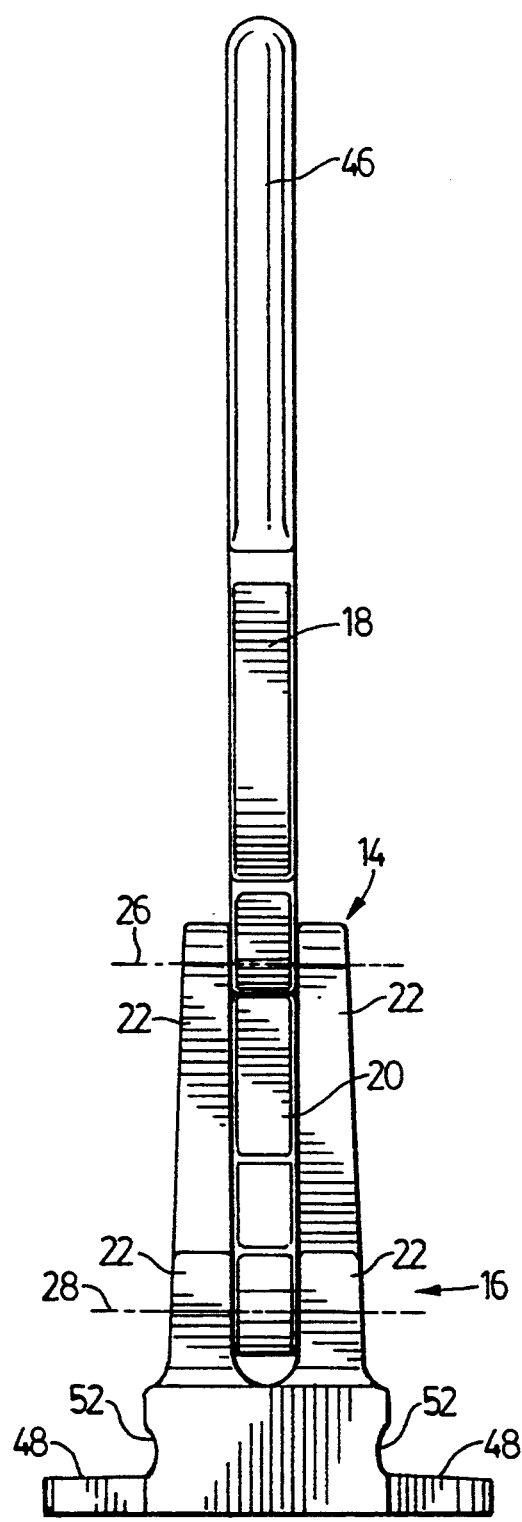
FIG. 4
FIG. 5

5,390,591

SHELL CRACKER

FIELD OF THE INVENTION

This invention is directed to a device for cracking the hard outer shell of nuts, crab claws, lobster claws and the like.

BACKGROUND OF THE INVENTION

Nuts, crab claws, lobster claws and the like must have their shells broken to access their meat. The shells are often difficult to break and a tool is usually required for assistance.

Conventional shell cracking tools (such as the common nutcracker) have a pair of levers that are pivotally connected to a common axis. A shell is placed between the levers and the levers are manually squeezed together (usually with one hand) to crack the shell.

Typically, these tools require the user to apply considerable force to crack the shell. This is because the levers provide the user with only a small mechanical advantage. The tools are intended to be held in one hand and may not be comfortably braced against a surface to assist the user in applying force to the levers. Some shells, such as stone crab shells, are especially hard to crack and cannot usually be broken with conventional crackers. Often a mallet is required to break these shells.

In the course of applying a great deal of force to the levers to crack a shell, it is difficult to immediately lessen the force once the initial crack occurs. As a result, the shell will often shatter under the excess force after the first crack causing a mess. Furthermore, the meat may become damaged when the shell shatters and may also have shell fragments embedded in it. In either case the meat will be less desirable to eat.

There is a need for a shell cracker that provides improved mechanical assistance for cracking the shell. Such an improved cracker would allow greater control of the force being applied in cracking the shell in order to reduce the occurrences of shattering and damage to the meat. Also, such an improved cracker would allow very hard shelled foods, such as stone crabs, to be cracked with relative ease.

SUMMARY OF THE INVENTION

In accordance with the present invention there is provided a shell cracker comprising:
 a base;
 front and rear supports connected to said base;
 an upper lever connected to said front support for rotation about a first axis;
 a lower lever connected to said rear support for rotation about a second axis that is parallel to said first axis, said first axis being spaced along said base from said second axis and being located a greater vertical distance from said base than said second axis;
 lower and upper jaws for contacting a shell, said lower jaw being located on said base between said front and rear supports, and said upper jaw being located on said lower lever;
 a cam located on said upper lever; and
 a cam follower located on said lower lever; wherein actuation of said upper lever causes said upper jaw to move toward said lower jaw to enable cracking of said shell.

Advantageously, the lever arrangement of the present invention provides improved mechanical assistance over conventional shell crackers. This is because the upper lever and cam act together to assist movement of the lower lever when applying force to the shell. In addition, the base allows the device to be braced against a surface to assist a user when applying force to the upper lever.

BRIEF DESCRIPTION OF THE DRAWINGS

For a better understanding of the present invention, and to show more clearly how it may be carried into effect, reference will now be made, by way of example to the accompanying drawings. The drawings show a preferred embodiment of the present invention, in which:

FIG. 4 is a front view of a shell cracker in accordance with FIG. 1;

FIG. 5 is a rear view of a shell cracker in accordance with FIG. 1;

DETAILED DESCRIPTION OF THE PREFERRED EMBODIMENT

Figure 1:
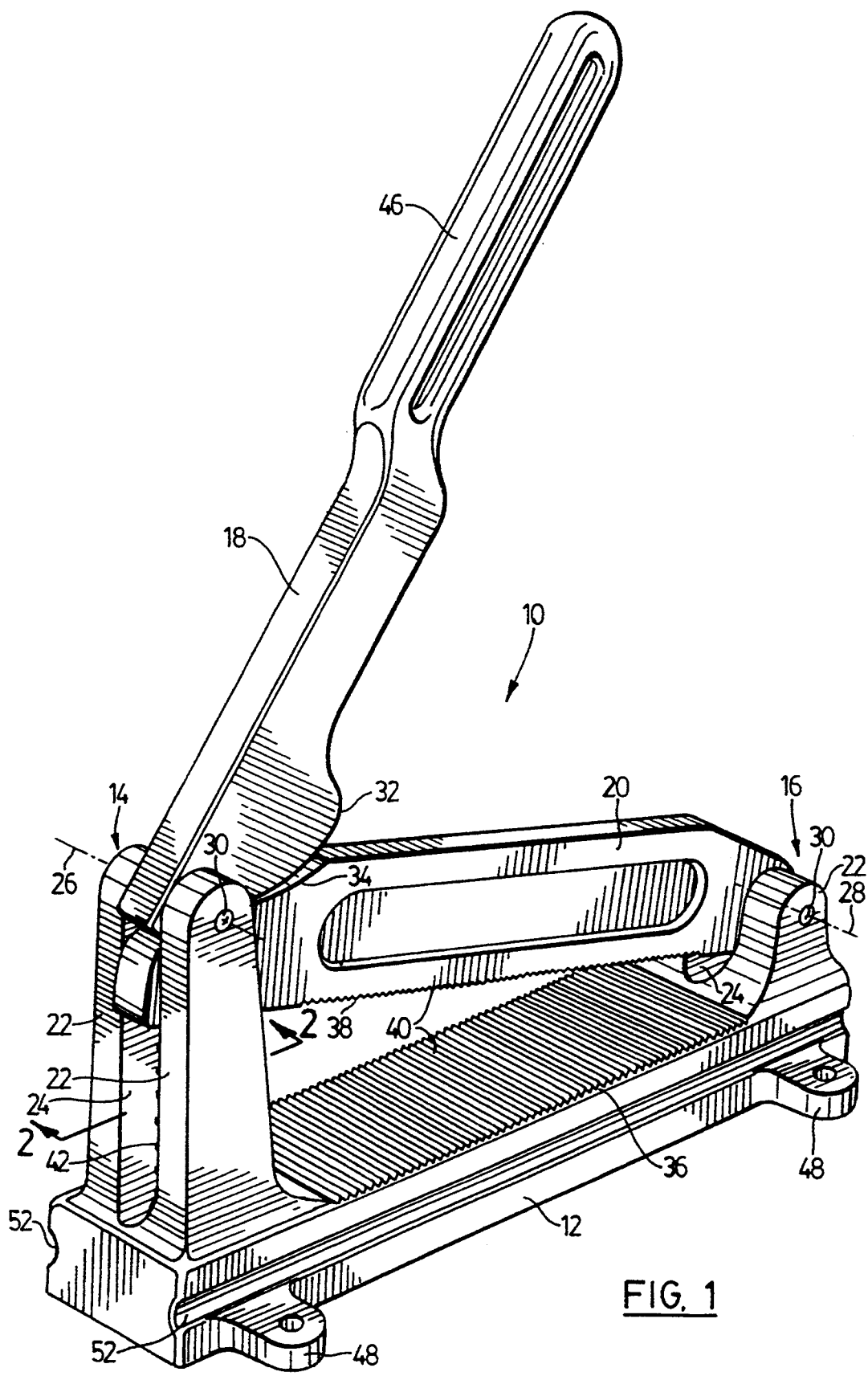
FIG. 1 is a perspective view of a shell cracker in accordance with the present invention.

A shell cracker in accordance with the present invention is shown generally at 10 in FIGS. 1 to 7. The shell cracker 10 has a base 12, front and rear supports 14 and 16, and upper and lower levers 18 and 20.

The supports 14, 16 each extend vertically upwardly from the base 12 and are molded integrally therewith. Each support 14, 16 has two parallel upstanding arms 22 that define between them a central slot 24. The central slot 24 is adapted to receive the levers 18, 20 and to restrict their plane of rotation. The slot 24 defined in the front support 14 acts to align the upper and lower levers 18, 20 in a common plane of rotation.

Figure 2:
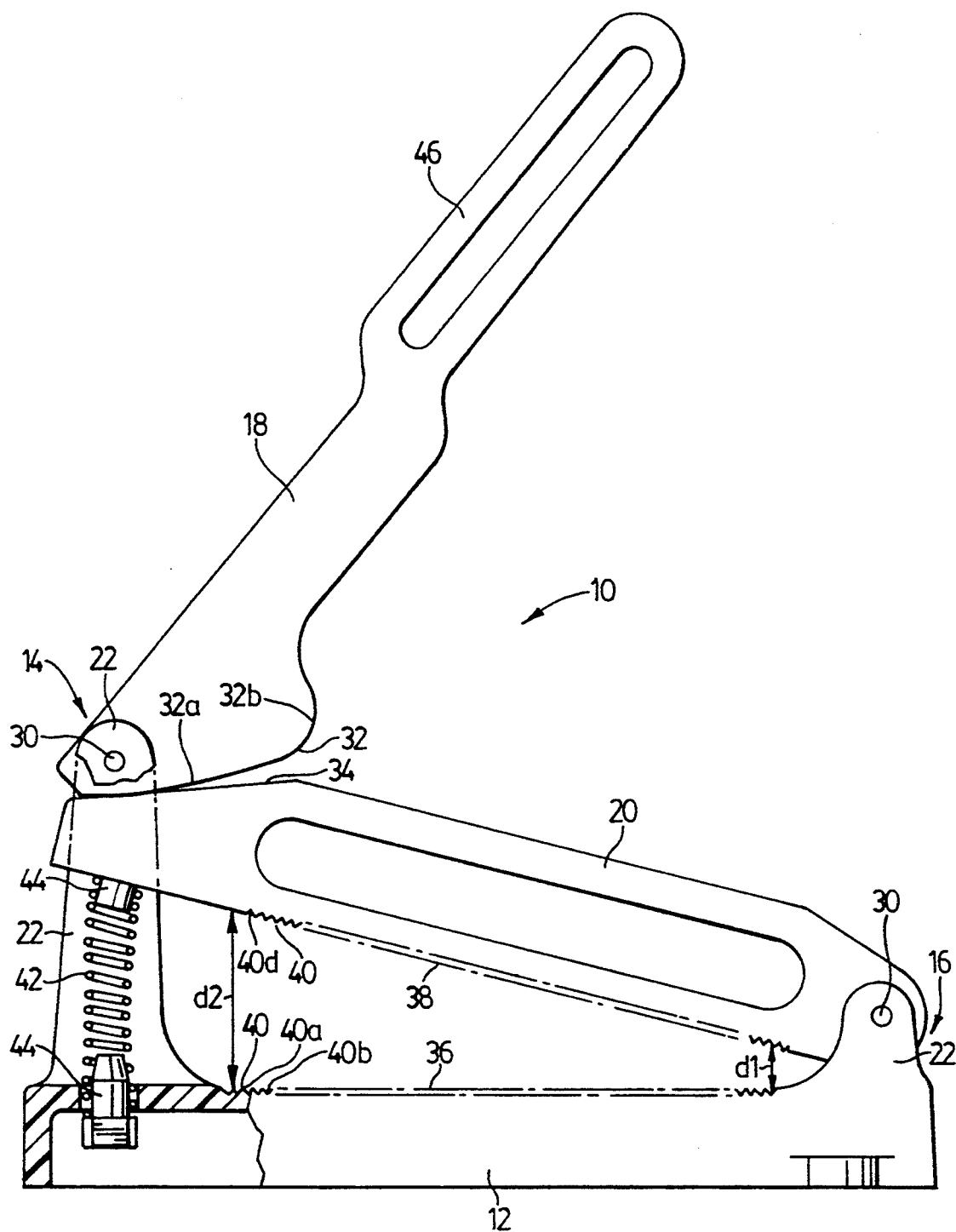
FIG. 2 is a part sectional side view of the shell cracker shown in FIG. 1 along lines 2—2, with the upper and lower jaws in an open position.
Figure 3:
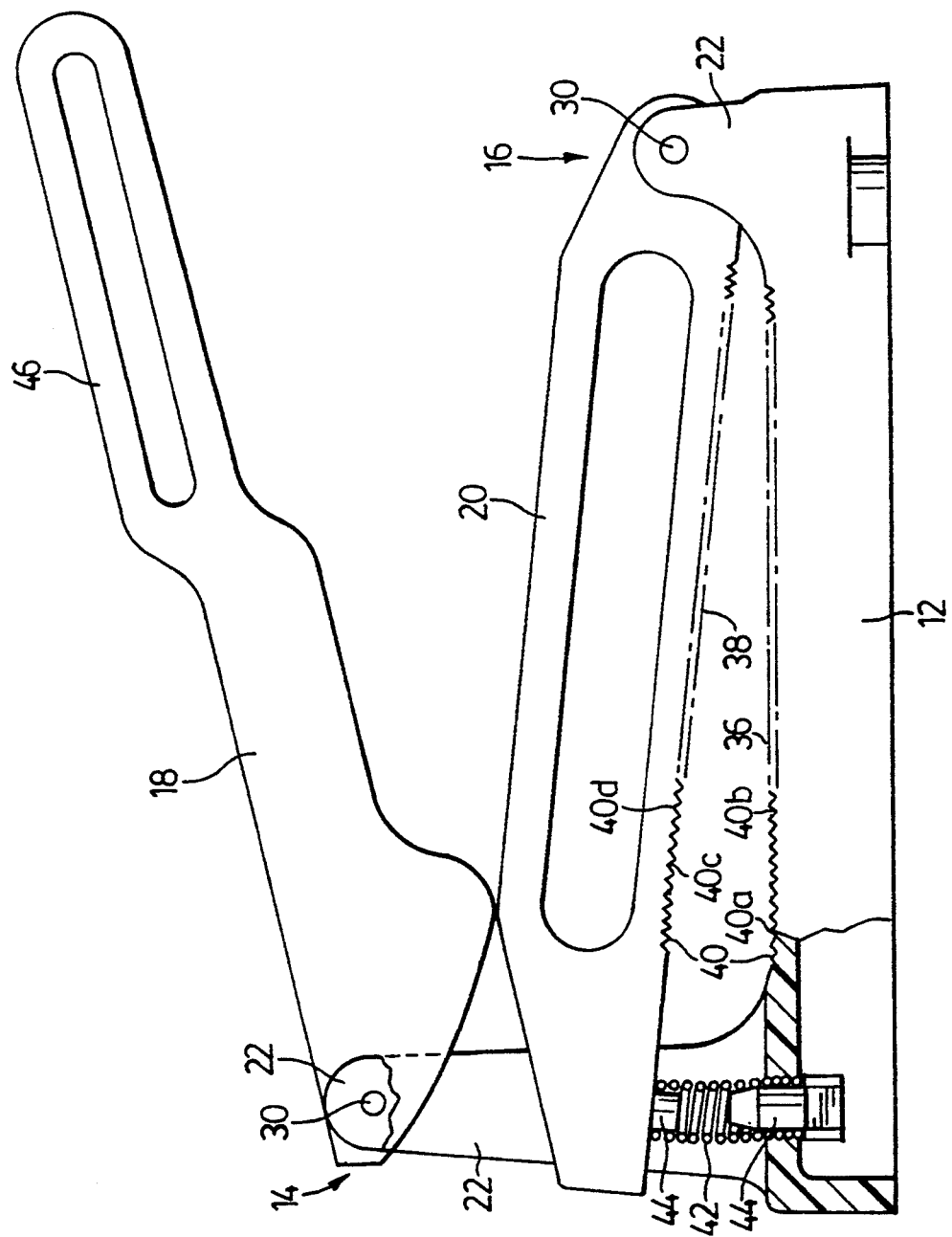
FIG. 3 is a part sectional side view of the shell cracker shown in FIG. 2, with the upper and lower jaws in a closed position.
Figure 6:
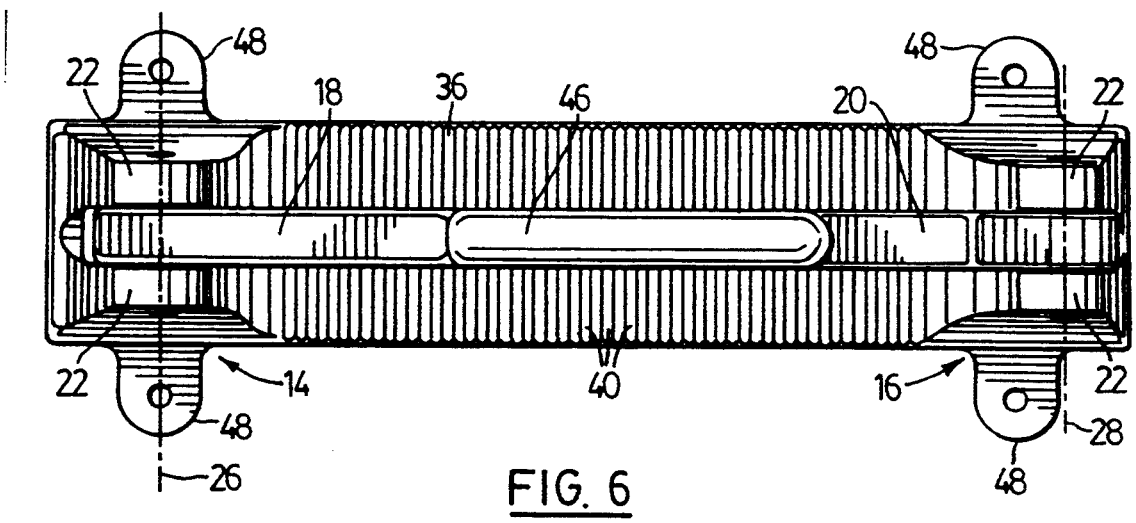
FIG. 6 is a top view of a shell cracker in accordance with FIG. 1.

The upper lever 18 is connected to the front support 14 for rotation about a first axis 26. The lower lever 20 is connected to the rear support 16 for rotation about a second axis 28. The first and second axes 26, 28 are parallel in order that the levers may have a common plane of rotation. The first axis 26 is positioned at a greater vertical distance above the base 12 than the second axis 28 in order that the upper lever 18 may act upon the lower lever 20. As shown in FIGS. 1 to 3, the lower lever 20 extends from the rear support 16 forwardly to the front support 14 and lies between the base 12 and the upper lever 18.

The levers 18, 20 are each connected to the supports 14, 16 by pins 30 that extend transversely through the arms 22 and the end of the respective levers 18, 20. The pins 30 are countersunk into the arms 22 of the supports 14, 16 and are held in place by a friction fit.

The upper lever 18 includes on its lower surface a downwardly facing cam 32 that is positioned adjacent to the fixed end of the upper lever 18. The lower lever 20 includes on its upper surface an upwardly facing cam follower 34 that is positioned adjacent to the free end of the lower lever 20 for cooperation with the cam 32. The cam 32 has a curved surface and the cam follower 34 has a planar surface. As shown in FIG. 2, the curved surface of the cam has first and second portions 32a and 32b. The first portion 32a has a larger radius of curvature than the second portion 32b. Also, the first portion 32a is positioned closer to the front support 14 than is the second portion 32b.

The cam 32 and the cam follower 34 are arranged such that movement of the upper lever 18 toward the base 12 will cause movement of the lower lever 20 toward the base 12. The cam 32 and cam follower 34 are each positioned adjacent to the free end of the lower lever 20 to maximize the mechanical assistance offered by the upper lever 18 in moving the lower lever 20.

The shell cracker 10 has lower and upper jaws 36 and 38, typically each 5 ¾ inches long, that are adapted for engaging the shell. The lower jaw 36 is located on the base 12 between the front and rear supports 14, 16. The upper jaw 38 is located on the lower surface of the lower lever 20. The jaws 36, 38 each include a series of transverse ridges or teeth 40 for deterring movement of the shell relative to the jaws 36, 38. The ridges or teeth 40 are inclined at opposing angles to further deter movement of the shell. As shown, the rearwardly facing surfaces 40a of the lower teeth have a shallower slope than the frontwardly facing surfaces 40b of the lower teeth. The rearwardly facing surfaces 40a of the upper teeth similarly have a shallower slope than the frontwardly facing surfaces 40d of the upper teeth. This arrangement, which functions somewhat like a pipe wrench, helps deter forward and rearward movement of the nut or claw being cracked. While a checkered pattern could be used, the arrangement shown, in which the channels 40e between the teeth extend from one side of each tooth to the other, facilitates washing the teeth (since water can flow laterally straight through the channels 40e). As shown in the figures, the ridges or teeth 40 may be molded directly onto the lower and upper jaws 36, 38. Alternatively, plates (not shown) containing the ridges or teeth 40 may be fastened to the respective jaws 36, 38. When the plates become dull or dirty, they can be removed and replaced. Alternative forms of friction surfaces may be used with the jaws 36, 38 instead of the ridges or teeth 40. The transverse ridges or teeth 40 are preferred however because, as mentioned, they are easy to clean.

A spring 42 is positioned within the slot 24 of the front support 14. The spring 38 extends between the base 12 and the lower surface of the lower lever 20 to bias the lower lever upwardly into abutment with the upper lever 18. The spring 38 is supported by plugs 44 that are molded into the base 12 and the bottom surface of the lower lever 20. As shown in FIG. 2, the spring is slightly bent along its length to correspond with the direction of travel of the lower lever 20 within the slot 24.

The spring 42 biases the jaws 36, 38 into an open position as shown in FIG. 2. In the open position the lower lever 20 slopes forwardly and upwardly, providing a small clearance d2 (e.g. ½ inch) between the jaws 36, 38 at their rears, and a larger clearance d2 (e.g. 1 ⅞ inch to 2 ⅛ inch) at their fronts. Movement of the upper lever 18 causes the jaws 36, 38 to move to a closed position as shown in FIG. 3, in which d1 reduces, e.g. to ¼ inch and d2 reduces e.g. to ½ inch.

The upper lever 18 has a handle portion 46 adjacent to its free end. The handle portion 46 is raised relative to the remainder of the upper lever 18 to provide a clearance space below the handle portion 46 that reduces the chances of the user's fingers being pinched when the jaws 36, 38 are in the closed position.

The base 12 has a broad width (e.g. 2 inches) to provide stability when the shell cracker 10 is braced against a surface. The lower jaw 36 is also wide (e.g. the same 2 inches) in order to provide support to larger shelled items such as walnuts, crab claws and lobster claws. The upper jaw 38 is narrower (e.g. ⅜ inch) than the lower jaw to provide more precise cracking with more pressure.

Figure 7:
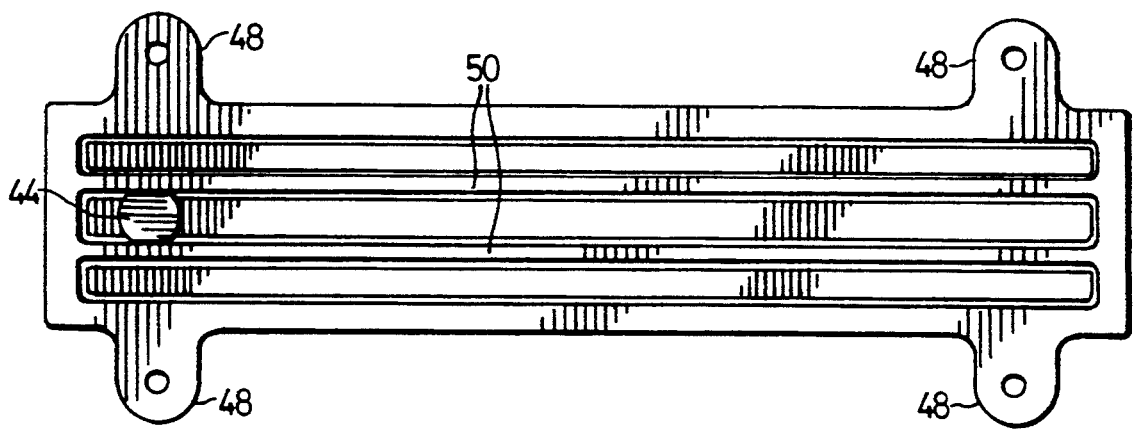
FIG. 7 is a bottom view of the shell cracker in accordance with FIG. 1.

A pair of mounts 48 extend from each side of the base 12 to permit the base 12 to be fastened to a surface such as a table or counter top. As shown in FIG. 7, the bottom surface of the base 12 includes a series of ribs 50 extending along its length. The ribs 50 provide rigidity to the base 12 while reducing the overall weight and amount of material required in the manufacture of the base 12. As shown in FIGS. 1, 4 and 5, a groove 52 is defined along the sides of the base 12. The groove 52 provides added rigidity to the base 12 in combination with the ribs 50.

All of the components of the shell cracker 10, except the pins 30 and the spring 42, are preferably molded from a plastic material such as ABS plastic. The pins 30 and spring 42 are preferably constructed of stainless steel. With such a construction the shell cracker may be washed without damaging the components.

The shell cracker operates as follows. The jaws 36, 38 are biased to an open position by the spring 42. A shell is placed between the open jaws 36, 38 and the upper lever 18 is moved by the user toward the lower lever 20. The movement of the upper lever 20 causes the cam 32 to contact the cam follower 34 and consequently move the second lever 20 toward the base 12. The jaws 36, 38 are thus moved from their open position to the closed position and the shell is crushed in the process. When the initial crack of the shell occurs, the user reduces the force applied to the first lever 18 to prevent the shell from shattering. Once the shell is sufficiently cracked the upper lever 18 is released and the jaws 36, 38 are biased back to their open position. Small items requiring greater force, e.g. stone crab claws, can be placed at the rear of the jaws. Certain nuts, e.g. pecans, can be cracked more cleanly if stood on their ends, and these can be placed in the higher space near the fronts of the jaws 36, 38.

It is to be understood that what has been described are preferred embodiments of the invention. The invention nonetheless is susceptible to certain changes and alternative embodiments fully comprehended by the spirit of the invention as described above, and the scope of the claims set out below.

I claim:

1. A shell cracker comprising:

a base;

front and rear supports rigidly connected to said base;

an upper lever connected to said front support for rotation about a first axis;

a lower lever connected to said rear support for rotation about a second axis that is parallel to said first axis, said first axis being spaced along said base from said second axis and being located a greater vertical distance from said base than said second axis;

lower and upper jaws for contacting a shell, said lower jaw being located on said base between said front and rear supports, and said upper jaw being located on said lower lever, wherein said lower jaw is wider than said upper jaw;

a series of teeth located on each of said upper and lower jaws, each said tooth spanning the full width of said jaws, said teeth defining channels between them for permitting washing of said jaws;

a cam located on said upper lever; and a cam follower located on said lower lever;

wherein rotation of said upper lever toward said lower jaw causes said upper jaw to move toward said lower jaw to enable cracking of said shell.

2. A shell cracker as claimed in claim 1 wherein said lower lever extends from said rear support to said front support.

3. A shell cracker as claimed in claim 2 wherein said cam and said cam follower are each positioned adjacent to said front support.

4. A shell cracker as claimed in claim 3 wherein said supports comprise means for aligning said upper and lower levers in a common plane of rotation.

5. A shell cracker as claimed in claim 4 wherein said lower lever has a free end adjacent said front support and wherein said means for aligning is provided by a slot defined in said front support for receiving said free end of said lower lever.

6. A shell cracker as claimed in claim 5 further comprising means for biasing said lower lever into abutment with said upper lever.

7. A shell cracker as claimed in claim 6 wherein said biasing means are positioned within said slot in said front support.

8. A shell cracker as claimed in claim 7 wherein said cam has a curved surface and said cam follower has a planar surface.

9. A shell cracker according to claim 1 and including means biasing said levers to an open position in which there is a space between said upper and lower jaws extending between said front and rear supports, said space increasing in height from said rear support to said front support, said jaws having a closed position in which said space is of lesser height but in which there is still a clearance between said jaws adjacent said rear and front supports.

10. A shell cracker according to claim 9 wherein said upper lever has a front portion adjacent said front support and a free end portion remote from said front support and overlying said lower lever, said free end portion being offset upwardly from said front portion.

11. A shell cracker comprising:

a base;

front and rear supports connected to said base;

an upper lever connected to said front rigid support for rotation about a first axis;

a lower lever connected to said rear rigid support for rotation about a second axis that is parallel to said first axis, said first axis being spaced along said base from said second axis and being located a greater vertical distance from said base than said second axis;

lower and upper jaws for contacting a shell, said lower jaw being located on said base between said front and rear supports, and said upper jaw being located on said lower lever, wherein said lower jaw is wider than said upper jaw:

a cam located on said upper lever, said cam having a curved camming surface with first and second portions, said first portion having a larger radius of curvature than said second portion, and said first portion being positioned closer to said front support than said second portion; and a cam follower located on said lower lever; wherein rotation of said upper lever toward said lower jaw causes said upper jaw to move toward said lower jaw to enable cracking of said shell.

* * * * *